United States Patent [19]

Boersma et al.

[11] 4,109,124

[45] Aug. 22, 1978

[54] CIRCUIT-BREAKERS FOR HIGH VOLTAGES

[75] Inventors: Rintje Boersma, Harmelen; Gijsbert Waldemar Irik, Bilthoven, both of Netherlands

[73] Assignee: Coq B.V., Utrecht, Netherlands

[21] Appl. No.: 670,963

[22] Filed: Mar. 26, 1976

[30] Foreign Application Priority Data

Apr. 7, 1975 [NL] Netherlands ..................... 7504130

[51] Int. Cl.² .......................................... H01H 33/54
[52] U.S. Cl. ............................ 200/148 B; 200/148 R
[58] Field of Search ...................... 200/148 B, 148 R

[56] References Cited

U.S. PATENT DOCUMENTS 3,743,804   7/1973   Frowein ........................ 200/148 B
3,846,601  11/1974   Leeds ............................ 200/148 B
3,909,571   9/1975   Aumayer ....................... 200/148 B
4,004,118   1/1977   Boersma et al. .............. 200/148 B Primary Examiner—Robert S. Macon
Attorney, Agent, or Firm—John P. Snyder

[57] ABSTRACT

Monophase or polyphase circuit-breaker for high voltages, in which the switch work is or the switch works of all phases together are insulatedly accommodated in a closed metal casing and the two end contact holders of the or each switch work are connected through connecting members having the shape of coaxial hollow spherical caps which face each other with their edges to the connecting conductors of the circuit-breaker which extend insulatedly through the wall of the casing, said spherical cap-shaped connecting members forming at the same time potential gradient controlling shields.

25 Claims, 9 Drawing Figures

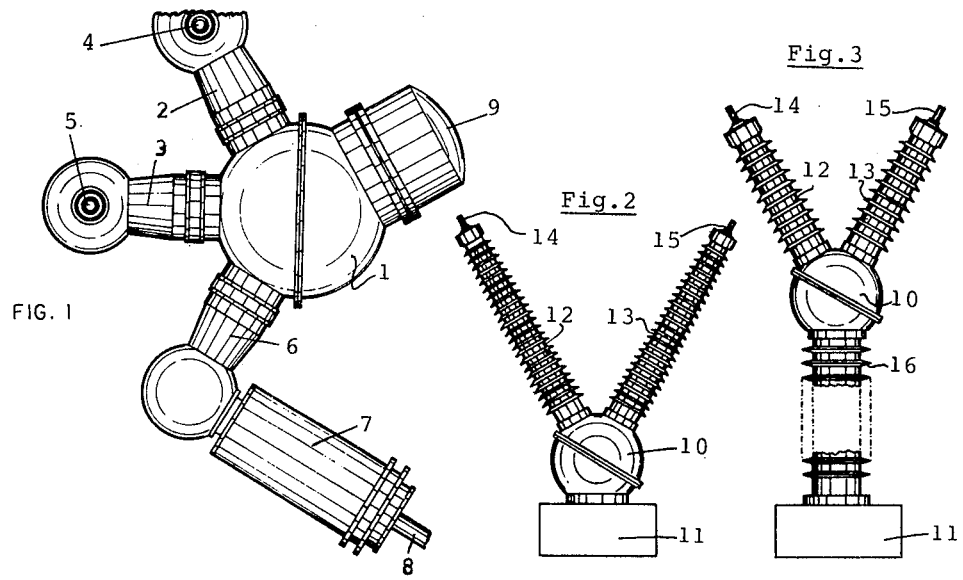
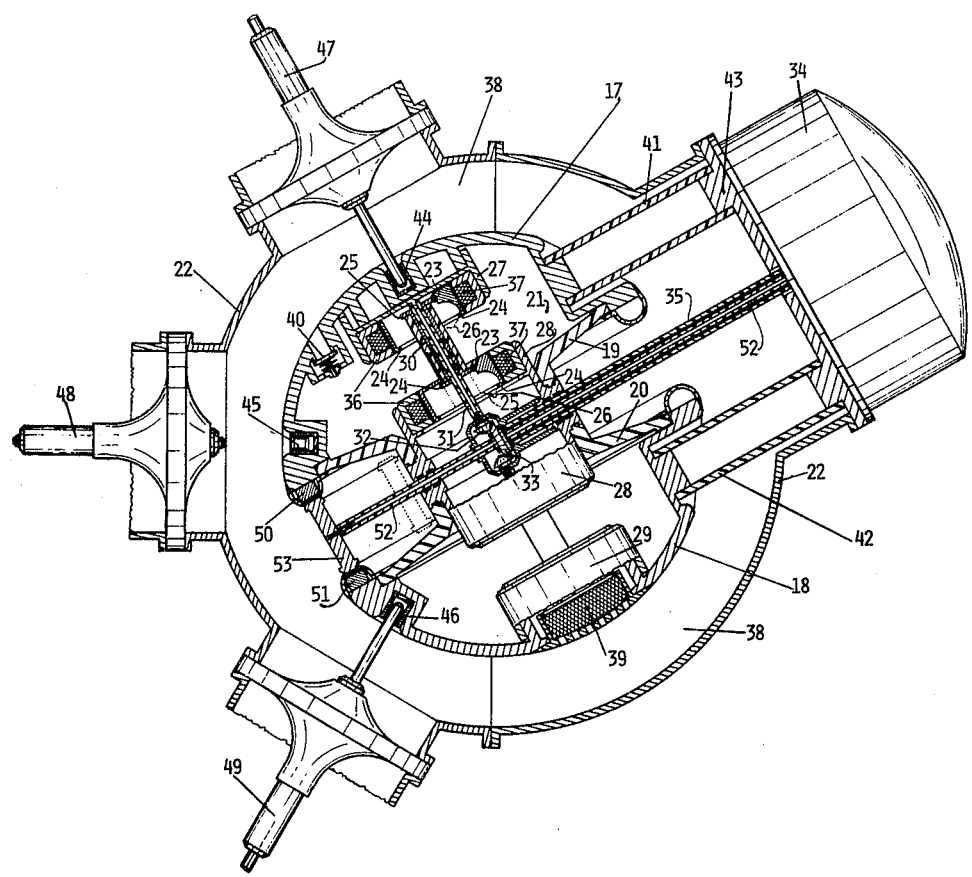

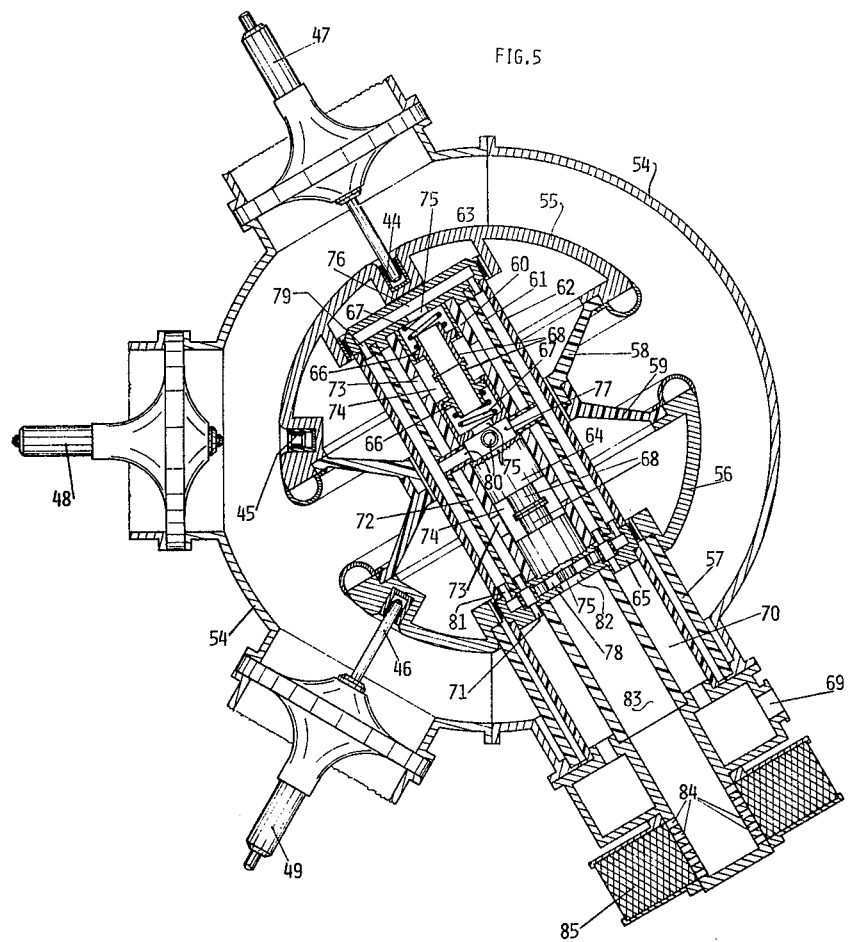

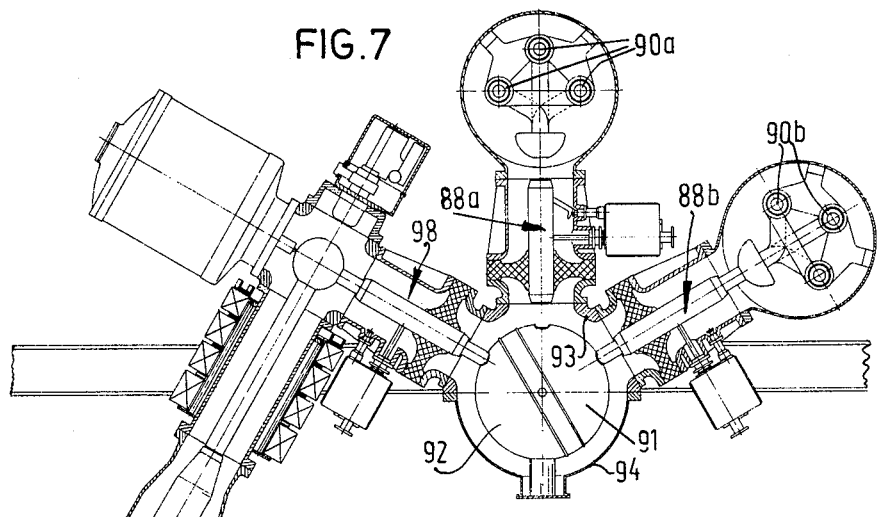
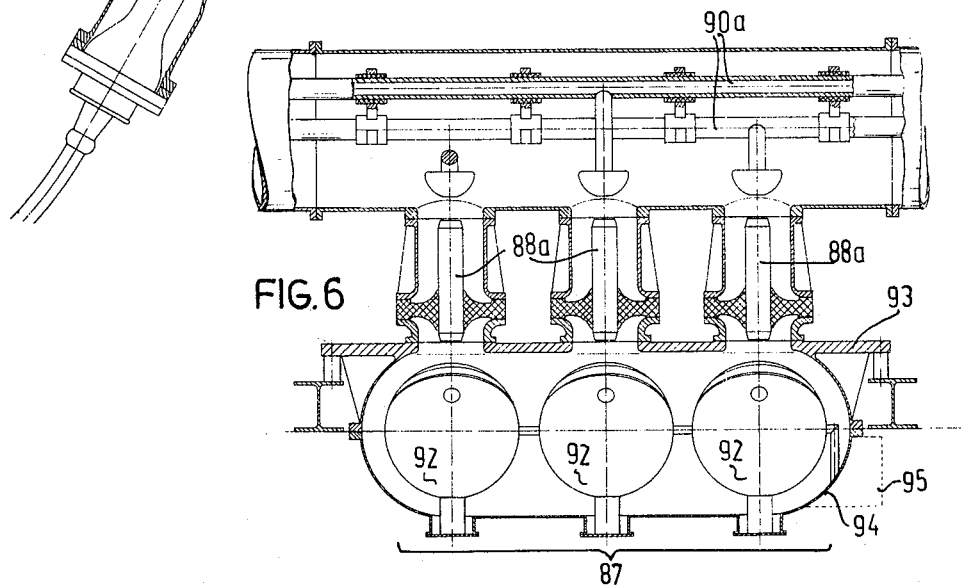
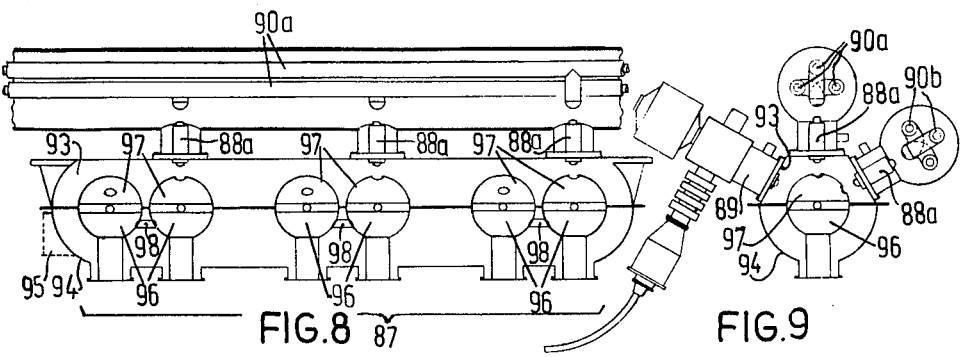

CIRCUIT-BREAKERS FOR HIGH VOLTAGES

The invention relates to a circuit-breaker for high voltages provided with a metal casing containing at least one monophase switching device which is insulatedly accommodated in the casing and at least one set of at least two connecting conductors extending insulatedly through the wall of said casing and being connected or adapted to be connected with the switching device.

The invention has for its object to provide a circuit-breaker of this kind, in which, in the first place, a very favourable distribution of the electric field is obtained in the casing, so that the insulating distances between the switching device and the metal casing can be kept relatively small; secondly, the volume of the switching device can be made big in respect of the dimensions of the casing, so that the parts of the switching device, such as the fixed and the movable contact members, can be placed at favourable distances from one another and can be constructed in many different shapes, whereas also the circuit-breaker can be easily provided with multiple interruptions, that means in each phase with a plurality of series connected pairs of co-operating contact members; thirdly, the circuit-breaker can be associated in many different ways with other parts, such as isolators, busbar-systems and cable junction devices, to compose a mono- or polyphase panel of the switch gear for high voltages. According to the invention this is achieved, in that the or each switching device is provided with at least one pair of fixed electrically conductive connecting members which are each connected or adapted to be connected to at least one connecting conductor on one hand and connected, in the operative condition of the circuit-breaker, to a contact holder on the other hand, said connecting members having the shape of coaxial hollow spherical caps which are kept spaced apart by insulators face each other with their edges.

Due to this spherical shape of the connecting members, which in many cases may advantageously have outer surfaces forming portions of one and the same spherical surface, a satisfactory distribution of the electric field is obtained in the circuit-breaker. Only in the places, where the connecting conductors, which may be constructed as isolators, are mounted, a disturbance of the electric field occurs which, however, can be easily mastered. Another advantage of this spherical shape is that the connecting conductors can be provided in almost any place, so that the circuit-breaker can be associated with other parts of a switching plant in many different ways.

When the circuit-breaker is a monophase circuit-breaker the casing thereof may also have a spherical shape and contain a pair of connecting members which have the form of spherical caps and are mounted concentrically in the casing.

For polyphase circuit-breakers a plurality of monophase circuit-breakers having each an individual casing may be used. However, should for such a construction the available space be deficient or should a switching plant having separate monophase circuit-breakers be too expensive, a construction is recommended, in which the monophase switching devices of the different phases are accommodated in a common grosso modo cylindrical casing and lie with their centres either on the longitudinal axis of the casing or on a line parallel to said axis. In that case the casing may consist of two separable parts adjoining each other in a plane of division which is parallel to the longitudinal axis of the casing or contains said axis. Then one part of the casing is stationary and supports all connecting conductors and the other part is removably mounted and carries all switching devices and their driving mechanism.

A useful construction of the polyphase circuit-breaker is obtained, when the longitudinal axis of the casing extends horizontally. Preferably, the plane of division between the parts of the casing is then a horizontal plane and the upper one of said parts then carry all connecting conductors and is stationary. The space which is required for the incoming and outgoing cables beneath the switch gear can then be used at the same time to remove the casing part carrying the switching devices which means a considerable saving of space. Furthermore the switching devices which become uncovered during the lowering of the lower part of the casing are still protected by the stationary upper part of the casing against dirt and other pollutions falling down. A third advantage is that in each phase the isolators between the cable and the busbar-systems on one hand and the circuit-breaker on the other hand can be disposed in a common vertical plane which is perpendicular to the longitudinal axis of the circuit-breaker. This facilitates the use of a plurality of busbar-systems, since these systems extend parallel to said axis, and the survey of the arrangement of the switch gear.

A satisfactory disassembly of the polyphase circuit-breaker is obtained, when the plane of division between the parts of the casing contain the centres of the switching devices. Preferably, the common driving mechanism of all monophase switching devices is mounted on an end wall of the removable part of the casing.

As the edges of the connecting members formed as spherical caps may have a large diameter and thereby extend at a relatively great distance form the surfaces of the insulators keeping said connecting members spaced apart, said edges can come to lie at a relatively small distance from one another. This makes it possible to use connecting members formed as spherical caps which are so big that they surround the switching space as potential controlling shields. Should the circuit-breaker be provided with a plurality of series connected pairs of co-operating contact members in the or each pair of cap-shaped connecting members belonging together, each cap-shaped connecting member may surround the place of interruption between the contact members of at least one pair of co-operating contact members as a potential controlling shield. For a monophase or a polyphase circuit-breaker having relatively many places of interruption connected in series or series connected pairs of co-operating contact members in the or each pair of cap-shaped connecting members belonging together a construction is recommended, in which the fixed contact member and the movable contact member of each pair of co-operating contact members are provided with co-operating arcing contact surfaces only and the connecting members formed as spherical caps of the or each pair of connecting members belonging together are directly electrically conductively connected with fixed contacts of a bridging-over switch, which is only used to conduct the working current and the movable switching contact of which is so coupled with the contact members having arcing contact surfaces only, as to ensure that the contacts of the bridging-over switch are, during the switching-off process, separated from one another before and, during the switching-in process, brought into contact with one another after the arcing contact surfaces of said series connected pairs of contact members do and have done so, respectively. The fixed contacts of the or each bridging-over switch may be advantageously provided in the edges of the a pair forming connecting members formed as spherical caps. Preferably, the movable switching contact of the or each bridging-over switch is so arranged as to be situated and to move within the spherical space defined by the outer surfaces of a pair of connecting members formed as spherical caps. The or each bridging-over switch is then switched in and off under almost no-current conditions. The connecting members formed as spherical caps which approach each other closely with their edges make it possible to use in such a pair of connecting members one single bridging-over switch which shunts may series connected places of interruption. Owing thereto the transition resistance in the closed circuit-breaker is diminished considerably. Moreover, the bridging-over switch can be easily mounted entirely within the space confined by the sphere of the a pair forming connecting members, so that the electric field in the space between the switching device and the metal casing is hardly affected by the bridging-over switch.

In a monophase or a polyphase circuit-breaker for very high voltages the or each monophase switching device may comprise at least two pairs of connecting members shaped as spherical caps surrounding pairs of co-operating contact members, said pairs of cap-shaped connecting members being connected in series between the connecting conductors of said switching device.

The invention will be further elucidated with the aid of the drawing. In the drawing illustrate:

FIG. 1 an elevational view of a monophase switching panel of a metal clad switching plant for high voltages including a spherical circuit-breaker constructed in accordance with the invention, FIGS. 2 and 3 elevational views of two variants of monophase spherical circuit-breakers constructed in accordance with the invention for open type switching plants, FIG. 4 on a larger scale an axial sectional view of a monophase circuit-breaker for the switch gear shown in FIG. 1, FIG. 5 on a larger scale an axial sectional view of another monophase circuit-breaker for metal clad switching plants of the kind illustrated in FIG. 1, FIG. 6 partially a vertical longitudinal sectional view, partially a longitudinal elevational view of a threephase switching panel provided with a threephase circuit-breaker, FIG. 7 partially a vertical cross sectional view, partially a cross elevational view of the switching panel shown in FIG. 6, FIG. 8 partially a diagrammatical longitudinal sectional view, partially a diagrammatical longitudinal elevational view of a variant of the threephase switching panel shown in FIGS. 6 and 7 and FIG. 9 partially a diagrammatical cross sectional view, partially a diagrammatical cross elevational view of the switching panel shown in FIG. 8.

The metal clad switch gear shown in FIG. 1 is provided with a closed metal casing and consists of a spherical circuit-breaker 1, two busbar isolators 2, 3 radially connected thereto, conductors 4 and 5 of two busbar-systems oriented perpendicularly to the plane of the drawing, a cable isolator 6 radially connected to the circuit-breaker and a box 7 for the connection of a cable 8 to the cable isolator 6. The casing of the circuit-breaker 1 supports also a box 9 containing means to drive and to control the circuit-breaker 1.

The circuit-breaker shown in FIG. 2 consists of a switching device accommodated in a spherical metal casing 10, a box 11 containing driving means and control means, the casing 10 being directly mounted on said box 11, and two connecting conductors 14, 15 surrounded by insulators 12, 13. The casing 10 and the box 11 may have earth potential.

The circuit-breaker illustrated in FIG. 3, which is a variant of that shown in FIG. 2 consists of a spherical metal casing 10 containing the switching device, a box 11 accommodating the driving means and the control means and the insulators 12, 13 containing the connecting conductors 14, 15. A supporting insulator 16 is provided between the casing 10 and the box 11. The box 11 may have earth potential and the casing 10 may have a potential which lies between that of the earth and that of the connecting conductors 14, 15.

The circuit-breakers illustrated in FIGS. 2 and 3 are intended for use in open type switch gear.

The circuit-breaker illustrated in FIG. 4 which is adapted to be used in the metal clad switch gear shown in FIG. 1 is provided with a switching device comprising four series connected pairs of contact members co-operating only as arcing contacts, so that the electric circuit is interrupted and closed in four places connected in series. The pairs of arcing contacts are situated in a switching space 21 confined between two coaxial hollow connecting members 17, 18 formed as spherical caps and two insulators 19, 20. The connecting members 17, 18 are concentrically positioned in the spherical metal casing 22. Each pair of co-operating contact members is provided with a fixed arcing contact 23 which is disposed coaxially in respect of the axis of the circuit-breaker coinciding with the common axis of the coaxial cap-shaped connecting members 17, 18 and can only be used to interrupt and to close the electric circuit, said arcing contact being electrically conductively connected with a fixed arcing ring 24. Co-operating with the arcing contact 23 and the arcing ring 24 is an axially movable arcing ring 25, which, in the closed position of the circuit-breaker, is in contact with the arcing contact 23 and, in the open position of the circuit-breaker, is found in the plane of the fixed arcing ring 24. The diameters of the peripheral edges of the arcing rings 24 and 25 differ from one another so as to form therebetween an annular gap, in which the switching arc 26 comes to move. The fixed contact members 23, 24 of the four pairs of contact members are mounted on contact holders 27, 28, 29, of which the contact holders 27 and 29 are directly attached to the cap-shaped connecting members 17, 18 and the contact holder 28 is supported by the insulators 19, 20. The movable arcing rings 25 are pairwise interconnected by conductive tubes. These tubes 30 are each axially movably attached to, but fixed against rotation in respect of a rotatable insulating tube 31. If this tube 31 is rotated through beveled toothed wheels 32, 33 by a tube 35 which is coupled with the driving means (not shown) accommodated in the box 34, the insulating tube 30 provided with the arcing rings 25 is axially moved and the circuit-breaker is switched in or off.

The contact holders 27, 28, 29 carry except the fixed contact members 23, 24 annular magnetic cores 36 which are mounted concentrically to the axis of the circuit-breaker and are provided with concentric coils 37 for the production of magnetic fields which are parallel to the axis of the circuit-breaker and make the switching arcs 26 set up between the concentric arcing rings 24, 25 during the switching-off process to whirl with great speed about said axis. Each coil 37 is connected between a contact holder 27, 28, 29 and an arcing ring 24 which operates at the same time as a short-circuit ring to cause a phase-shift between the current of the arc and the magnetic field. The switching arc 26 set up between the two arcing rings 24 and 25 of each pair of co-operating arcing rings is originally radially directed and is rotated quickly about the axis of the circuit-breaker by the magnetic field of the coil 34. Due to the cooling and deionizing action of the gas the reignition of the arc after the zero transition of the current is made difficult or prevented.

The switching space 21 and the outer space 38 contain sulphur-hexafluoride ($SF_6$). The pressures in these spaces are equal, when the circuit-breaker is at rest. However, the gas contained in the switching space 21 is heated by the switching arcs 26, so that the pressure in said space is increased. This has the result, that the gas which is contaminated by the switching process is forced through a passage provided with a filter 39 to the outer space 38 extending between the connecting members 17, 18 formed as spherical caps and the metal casing 22. The filter 39 makes sure that only purified gas comes in said outer space, so that the insulation therein remains of high quality. If after the switching-off process the gas contained in the switching space 21 cools again, a reduced pressure is caused in said space which results in that purified gas from the outer space 38 returns to the switching space 21 through a passage provided with a check valve 40 which opens easily towards the switching space 21. The flow-resistance via the check valve is considerably smaller than that via the filter 39, so that a flow-back through the filter need not be feared.

The connecting members 17 and 18 formed as spherical caps are supported by insulators 41, 42 which are attached to a cover plate 43. The connecting members 17 and 18 contain also the fixed contact members 44, 45, 46 of two busbar isolators 47, 48 and a cable isolator 49. Although the connecting conductors of the circuit-breaker carried out as isolators extend with their main axes in one and the same plane containing the centre of the spherical casing 22 it will be apparent that the cap-shaped connecting members 17, 18 allow rather random directions of the connecting conductors or isolators, so that the circuit-breaker can be associated in many different ways with other parts to form a switching plant.

Mounted in the outer space 38 is a separate switch shunting the four places of interruption connected in series. This bridging-over switch consists of two fixed contacts 50, 51 provided in the edges of the cap-shaped connecting members 17, 18 and electrically conductively connected to said members and a bridging contact 53 which co-operates with said fixed contacts and is secured to an axially movable driving insulator 52. The contacts 50, 51 and 53 of this bridging-over switch are brought into contact with one another during the switching-in process and are separated from one another during the switching-off process at an earlier time than the arcing contact surfaces 23, 25 of the four pairs of contact members co-operating in the switching space. Consequently, the bridging-over switch operates under no-current conditions.

Due to the fact, that the edges of the cap-shaped connecting members 17, 18 have a large diameter, so that they extend in the outer space containing only gas of high insulating quality and owing thereto are adapted to approach each other closely, the bridging-over switch can be easily accommodated in the space within the spherical surface defined by the connecting members 17, 18. Due thereto the radial field which extends in the outer space 38 between the connecting members 17, 18 and the wall of the casing 22 will practically not be affected by said switch.

FIG. 5 shows an axial sectional view of a gas blast circuit-breaker which operates with air or nitrogen and is adapted to interrupt a circuit only. Also this circuit-breaker has a spherical casing 54. The switch work is provided with fixed coaxial, hollow connecting members 55, 56 formed as spherical caps and supported by a tubular insulator 57 and by insulators 58, 59 keeping said connecting members spaced apart. The actual switching unit extending with its main axes in the common axis of the cap-shaped connecting members 55, 56 is mounted for actual removement and electrically conductively connected to said fixed connecting members. The switching unit includes contact holders 63, 64, 65 kept spaced apart by concentric tubular insulators 60, 61, 62 and provided with cylinders for pistons 66, which are attached to four pairwise co-operating axially movable tubular contacts 68 which are loaded by springs 67. For the switching-off operation of this circuit-breaker air or nitrogen is supplied under pressure at 69 and is directed through passage 70, the ports 71, the space 72 between the insulating tubes 60 and 61 and the ports 73 into the switching space 74. The tubular contacts 68 are then separated from one another by the pressure exerted on the pistons 66. Owing thereto the extinguishing gas can escape to the atmosphere through the tubular contacts 68, the ports 75, the chambers 76, 77, 78, the ports 79, 80, 81, 82, the space 83 extending between the insulating tubes 61 and 62, the space 84, the ports 85 and the filter 86, so that the switching arcs set up between the tubular contacts 69 are quenched. If there is no supply of extinguishing gas anymore the tubular contacts are pushed again towards each other by the springs 67. In the switch gear this circuit-breaker is connected in series with an isolator to keep the circuit interrupted and to close the circuit. This series connected isolator may be the shown cable isolator 46, 49, which is equal to the corresponding isolator 46, 49 of the switch gear illustrated in FIG. 4. The same applies for the busbar isolators 44, 47 and 45, 48. Also in this latter embodiment of the invention the fixed contacts 44, 45, 46 of the isolators are mounted directly in the connecting members 55, 56 formed as spherical caps.

In the circuit-breakers of the open type shown in FIGS. 2 and 3 the isolator 44, 47 is omitted and the isolators 45, 48 and 46, 49 are replaced by the connecting conductors 15, 14 which are directly connected to the cap-shaped connecting members 17, 18 or 55, 56.

It will be obvious that the circuit-breakers having multiple interruption will be generally provided with means, such as high-ohmic resistances or condensers, for the even distribution of the potential over the places of interruption connected in series.

The threephase switching panel shown in FIGS. 7 and 8 is provided with a threephase circuit-breaker 87, three pairs of busbar isolators 88a, 88b, three cable isolators 89 and two threephase busbar-systems 90a, 90b.

The circuit-breaker consists in each phase of a switching device (not shown and for instance corresponding to that shown in FIG. 4) which is enclosed by two connecting members 91, 92 formed as spherical caps. Also the isolators may be those of the monophase switch gear illustrated in FIGS. 1 and 4.

The three switching devices of the circuit-breaker provided with two cap-shaped connecting members 91, 92 each are accommodated in a common casing, which consists of a stationary upper part 93 and a removable lower part 94 adapted to be lowered. The longitudinal axis of the casing 93, 94 extends horizontally and the plane of division between the parts 93, 94 of the casing extends also horizontally and contains said axis. The centres of the spheres formed by the pairs of connecting members 91, 92 lie on said axis.

The stationary upper part 93 of the casing supports all isolators 88a, 88b and 89 and through said isolators also the two busbar-systems 90a and 90b. The removable lower part 94 of the casing carries the spheres 91, 92 comprising the switching devices and also the driving mechanism 95, which is attached to an end wall of the lower part 94 of the casing.

The threephase switch gear illustrated in FIGS. 8 and 9 differs from that shown in FIGS. 6 and 7 in that each phase of the circuit-breaker comprises two series connected pairs of connecting members 96, 97 forming together a sphere which encloses a switching device (not shown). The division of each sphere extends horizontally. The lower semi-spherical connecting members 96 of each phase are interconnected by a conductor 98. The left hand upper semi-spherical connecting member 97 of each phase is connected to the cable-isolator and the right hand upper semi-spherical connecting member 97 of each phase is connected to the busbar-isolators. Each sphere 96, 97 may comprise, as in FIG. 4, four pairs of co-operating contact members, so that this circuit-breaker has in each phase eight places of interruption connected in series and is adapted for very high voltages.

It will be apparent, that also more than two spheres may be connected in series in each phase. Moreover, the monophase circuit-breakers may also be provided with a plurality of series connected spheres enclosing switching devices.

Furthermore it is observed that it is not necessary that the longitudinal axis of the casing of the threephase circuit-breaker extends horizontally. The same applies to the plane of division between the parts of the casing, even if the longitudinal axis of the casing of the three- or polyphase casing extends horizontally.

What we claim is:

1. A circuit-breaker for high voltages comprising a metal casing, at least one monophase switching unit which is insulatedly accommodated in the casing, said switching unit comprising at least one pair of electrically conductive fixed connecting members, at least one insulator to keep said connecting members spaced apart and electrically separated, at least one pair of relatively movable cooperating contacts to make and break electrical connection between said members; at least two terminal bushings extending through the wall of the casing, each one of said bushings being adapted to connect a connecting member with an end of the electric circuit to be controlled, each connecting member being in the form of a cap in the shape of a hollow segment of a sphere and the two connecting members being disposed in spaced opposition with said insulator interposed therebetween.

2. A circuit-breaker as claimed in claim 1, in which the outer surfaces of the two connecting members of said monophase switching unit form portions of one and the same spherical surface.

3. A circuit-breaker as claimed in claim 1 wherein a second pair of relatively movable cooperating contacts is connected in series with the first pair and in which the two connecting members of said monophase switching unit together surround a space containing said series connected pairs of cooperating contacts and each enclose, as a potential controlling shield, the point of break of the contacts of at least one such pair.

4. A circuit-breaker as claimed in claim 1, in which the two connecting members of said monophase switching unit together surround a space containing said pair of cooperating contacts and wherein the contacts of said pair are arcing contacts provided with cooperating arcing contact surfaces only, and in which two fixed contacts and a movable bridging contact cooperating therewith are provided, said fixed contacts and movable bridging contact constituting together a bridge switch, of which the fixed contacts are each electrically conductively attached to an individual one of said connecting members and the movable bridging contact is operatively so coupled with the arcing contacts as to ensure that the bridge switch is opened before the arcing contacts are separated and is closed after the arcing contacts have been brought into contact with one another.

5. A circuit-breaker as claimed in claim 4, in which the fixed contacts of the bridge switch are mounted in the edges of the two connecting members.

6. A circuit-breaker as claimed in claim 4, in which the movable switching contact of the bridge switch is situated and moves within the spherical space defined by the outer surfaces of the two connecting members of such a monophase switching unit.

7. A circuit-breaker as claimed in claim 1, in which accommodated in the casing are at least two monophase switching units which are connected in series between the respective terminal bushings through their cap-shaped connecting members and their pairs of cooperating contacts.

8. A monophase circuit-breaker as claimed in claim 1, in which the casing has the shape of a sphere and contains one single monophase switching unit, the two cap-shaped connecting members of said switching unit being concentrically disposed in the casing.

9. A polyphase circuit-breaker as claimed in claim 1, in which the casing has a substantially cylindrical shape and contains the monophase switching units of all phases of the circuit-breaker, the cap-shaped connecting members of all monophase switching units lying with the centers of their curved outer surfaces on a common line which is at least parallel to the longitudinal axis of the casing.

10. A polyphase circuit-breaker as claimed in claim 9, in which the casing consists of two separable parts adjoining each other in a plane of division which is at least parallel to the longitudinal axis of the casing, one part of the casing being stationary and supporting all terminal bushings and the other part thereof being removable and carrying all monophase switching units, and in which at least one mechanism for driving the movable contacts of the switching units is provided, said driving mechanism being also supported by the movable part of the casing.

11. A polyphase circuit-breaker as claimed in claim 10, in which the plane of division between the parts of the casing is a horizontal plane and the upper part of the casing is stationary and supports the terminal bushings.

12. A polyphase circuit-breaker as claimed in claim 9, in which the centers of the outer surfaces of the connecting members of the monophase switching units lie in the plane of division of the casing.

13. A polyphase circuit-breaker as claimed in claim 10, in which a common mechanism for driving the movable contacts of all monophase switching units is provided and said driving mechanism is mounted on an end wall of the removable part of the casing.

14. A circuit-breaker as claimed in claim 1, in which at least one fixed contact and one axially movable switching rod cooperating therewith are provided in the casing, said fixed contact and said switching rod constituting together an isolator switch, of which the fixed contact forms part of one of the cap-shaped connecting members and the switching rod forms part of the conductor of one of the terminal bushings.

15. In a circuit breaker for high voltages, the combination of:
   a metal casing adapted to contain a dielectric gas;
   a switching assembly comprising a pair of electrically conductive, cup-like members disposed in opposed relation to present spaced, registered peripherally extending edges, and an insulator interposed between said members whereby said assembly is of hollow form and said members are electrically separated from each other, said assembly being disposed within the confines of said casing with said members being spaced therefrom;
   first conductor means passing through said casing and electrically connected to one member of said pair;
   second conductor means passing through said casing and electrically connected to the other member of said pair; and
   switching means within the interior of said assembly for making and breaking electrical connection between said members.

16. In a circuit breaker as defined in claim 15 wherein each of said members is of semi-spherical shape.

17. In a circuit breaker as defined in claim 15 wherein said assembly is adapted to contain a dielectric gas and including filter means communicating the interior of said switching assembly with the interior of said casing for allowing dielectric gas heated by arcing produced by breaking of the electrical connection by said switching means to escape into the interior of said casing without significant contamination of the dielectric gas in the latter, and check valve means in said assembly for allowing substantially uncontaminated dielectric gas to flow into the interior of said assembly from the interior of the casing.

18. In a circuit breaker as defined in claim 15 wherein said insulator presents a recess extending inwardly from said peripheral edges of said members, and including a bridging contact movable within the confines of said recess between an operative position electrically connecting said peripheral edges and an inoperative position spaced from said peripheral edges but disposed within the confines of said recess.

19. In a circuit breaker as defined in claim 18 including actuator means connected to said switching means and to said bridging contact for moving said bridging contact to its inoperative position prior to opening said switching means and for moving said bridging contact to its operative position subsequent to closing said switching means.

20. An electrical circuit breaker for high voltages, comprising in combination:
   a metal casing containing a dielectric gas and having at least a pair of insulator bushings, a first terminal member projecting into the interior of said casing through one of said insulator bushings and a second terminal member projecting into the interior of said casing through the other of said insulator bushings, said terminal members forming part of an electrical circuit which is to be controlled by the circuit breaker;
   a generally spherical switching unit disposed within said casing and comprising a first semi-spherical connecting member connected with said first terminal member, a second semi-spherical connecting member connected with said second terminal member, an annular insulator interposed between said connecting members whereby electrically to separate them, switching means within the confines of said connecting members and said annular insulator for making and breaking electrical connection between said connecting members whereby to confine arcing during such making and breaking to the interior of the switching unit; and
   actuator means for selectively actuating said switching means to make and break electrical connection between said connecting members.

21. An electrical circuit breaker as defined in claim 20 wherein said annular insulator presents an annular recess between said connecting members, a bridging contact movable within the confines of said recess between an operative position electrically connecting said connecting members and an inoperative position spaced from said connecting members.

22. An electrical circuit breaker as defined in claim 21 wherein said actuator means is connected to said bridging contact for moving same to its inoperative position prior to breaking said switching means and for moving the bridging contact to its operative position subsequent to making said switching means.

23. A circuit breaker as defined in claim 20 wherein said switching means comprises a contact holder fixed substantially centrally within said switching unit, and axially movable contact means carried by said contact holder providing axially separated arcing regions within said switching unit.

24. A circuit breaker as defined in claim 23 wherein said actuating means comprises a source of pressurized gas for shifting said axially movable contact means.

25. A circuit breaker as defined in claim 23 wherein said actuating means comprises mechanical mechanism for shifting said axially movable contact means.

* * * * *